United States Patent
Wakabayashi et al.

(10) Patent No.: US 12,501,009 B2
(45) Date of Patent: Dec. 16, 2025

(54) PROJECTOR DEVICE, PROJECTOR, SUPPORTING DEVICE, ABNORMALITY DETERMINATION DEVICE, AND ABNORMALITY DETERMINATION METHOD

(71) Applicant: SEIKO EPSON CORPORATION, Tokyo (JP)

(72) Inventors: Shinichi Wakabayashi, Suwa (JP); Tatsuya Takahashi, Azumino (JP); Hideyuki Yamada, Nagano-ken (JP); Yasuhiro Sudo, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/616,601

(22) Filed: Mar. 26, 2024

(65) Prior Publication Data

US 2024/0333898 A1    Oct. 3, 2024

(30) Foreign Application Priority Data

Mar. 27, 2023  (JP) ................. 2023-050076

(51) Int. Cl.
*H04N 9/31*    (2006.01)
*G01H 1/00*    (2006.01)

(52) U.S. Cl.
CPC ........... *H04N 9/3194* (2013.01); *G01H 1/00* (2013.01)

(58) Field of Classification Search
CPC ................. H04N 9/3194; G01H 1/00
See application file for complete search history.

(56) References Cited

U.S. PATENT DOCUMENTS

2010/0253989 A1* 10/2010 Shimizu ............... G02B 27/104
                                                       359/199.1
2020/0057029 A1    2/2020 Irie et al.

FOREIGN PATENT DOCUMENTS

| JP | 2006-250660 A | 9/2006 |
| JP | 2013061515 A * | 4/2013 |
| JP | 2014-106410 A | 6/2014 |
| JP | 2017-128970 A | 7/2017 |
| JP | 2018004669 A * | 1/2018 |
| JP | 2021085957 A * | 6/2021 |
| JP | 2022-073096 A | 5/2022 |
| WO | WO 2018/198665 A | 11/2018 |
| WO | WO-2019071769 A1 * | 4/2019 ........... H04N 9/3194 |

OTHER PUBLICATIONS

JP-2021085957-A English translation (Year: 2021).*

* cited by examiner

*Primary Examiner* — John R Schnurr
(74) *Attorney, Agent, or Firm* — Dority & Manning, P.A.

(57) ABSTRACT

A projector device includes: a projector supported in a suspended state by a supporting device; a vibration generation device that generates a vibration acting on at least one of the supporting device and the projector; a vibration detection device that detects a vibration of the projector; and a reporting device that compares a detection value detected by the vibration detection device with a reference value and gives a report when a reporting condition is satisfied.

9 Claims, 8 Drawing Sheets

PROJECTOR DEVICE, PROJECTOR, SUPPORTING DEVICE, ABNORMALITY DETERMINATION DEVICE, AND ABNORMALITY DETERMINATION METHOD

The present application is based on, and claims priority from JP Application Serial Number 2023-050076, filed Mar. 27, 2023, the disclosure of which is hereby incorporated by reference herein in its entirety.

BACKGROUND

1. Technical Field

The present disclosure relates to a projector device, a projector, a supporting device, an abnormality determination device, and an abnormality determination method.

2. Related Art

According to the related art, a projector that projects image light onto a projection target surface such as a screen can be used in a regular posture in which the projector is installed on a table and in a suspended posture in which the projector is turned upside down and suspended from a ceiling or a wall, using an attachment member. When the projector is used in the suspended posture, using the attachment member, the projector may come off the attachment member due to deterioration with time or the like.

Meanwhile, a projector whose suspended state with a hook can be determined is known. JP-A-2022-073096 and JP-A-2014-106410 are examples of such a projector.

The projector described in JP-A-2022-073096 includes: a projector main body; a support member fixed to a bottom surface of the projector main body; an attachment member fixed to a support pillar of a hook; a sensor disposed between the support member and the attachment member and detecting items such as pressure change, contact state, and distance change; and a reporting unit. The projector described in JP-A-2022-073096 determines a change in the suspended state of the projector main body, based on the result of detection by the sensor, that is, based on an initial detection value detected by the sensor when the projector main body is installed in the suspended state and a current detection value detected by the sensor, and causes the reporting unit to report prediction information about the change in the suspended state and falling warning information, based on the result of the determination.

The projector device described in JP-A-2014-106410 is a ceiling-suspended projector device. The projector device measures the distance to a screen by a distance measuring sensor, ad outputs a warning message or sound when acquired distance measurement a warning information is changed from previous distance measurement information.

However, the configurations of the projectors described in JP-A-2022-073096 and JP-A-2014-106410 have a problem in that, unless a relatively large change is generated in the installation state of the projector, a change in the installation state is hard to detect.

Therefore, a configuration that enables earlier detection of a change in the installation state of the projection is demanded.

SUMMARY

According to a first aspect of the present disclosure, a projector device includes: a projector supported in a suspended state by a supporting device; a vibration generation device that generates a vibration acting on at least one of the supporting device and the projector; a vibration detection device that detects a vibration of the projector; and a reporting device that compares a detection value detected by the vibration detection device with a reference value and gives a report when a reporting condition is satisfied.

According to a second aspect of the present disclosure, a projector supported in a suspended state by a supporting device is provided. The projector includes: a vibration generation device that generates a vibration; a vibration detection device that detects a vibration; and a reporting device that compares a detection value detected by the vibration detection device with a reference value and gives a report when a reporting condition is satisfied.

According to a third aspect of the present disclosure, a supporting device supporting a projector in a suspended state is provided. The supporting device includes: a vibration generation device that generates a vibration; a vibration detection device that detects a vibration; and a reporting device that compares a detection value detected by the vibration detection device with a reference value and gives a report when a reporting condition is satisfied.

According to a fourth aspect of the present disclosure, an abnormality determination device includes: a vibration generation device that generates a vibration acting on at least one of a supporting device and a projector installed in a suspended state by the supporting device; a vibration detection device that detects a vibration; and a reporting device that compares a detection value detected by the vibration detection device with a reference value and gives a report when a reporting condition is satisfied.

According to a fifth aspect of the present disclosure, an abnormality determination method is executed by a control device that controls a vibration generation device which generates a vibration acting on at least one of a supporting device and a projector supported in a suspended state by the supporting device, a vibration detection device which detects a vibration, and a reporting device. The abnormality determination method includes: a vibration generation procedure of causing the vibration generation device to generate a vibration; a detection procedure of causing the vibration detection device to detect the generated vibration; and a reporting procedure of comparing a detection value of the vibration detected by the vibration detection device with a reference value and causing the reporting device to give a report when a reporting condition is satisfied.

DESCRIPTION OF EMBODIMENTS

First Embodiment

A first embodiment of the present disclosure will now be described with reference to the drawings.

Schematic Configuration of Projection System

Figure 1:
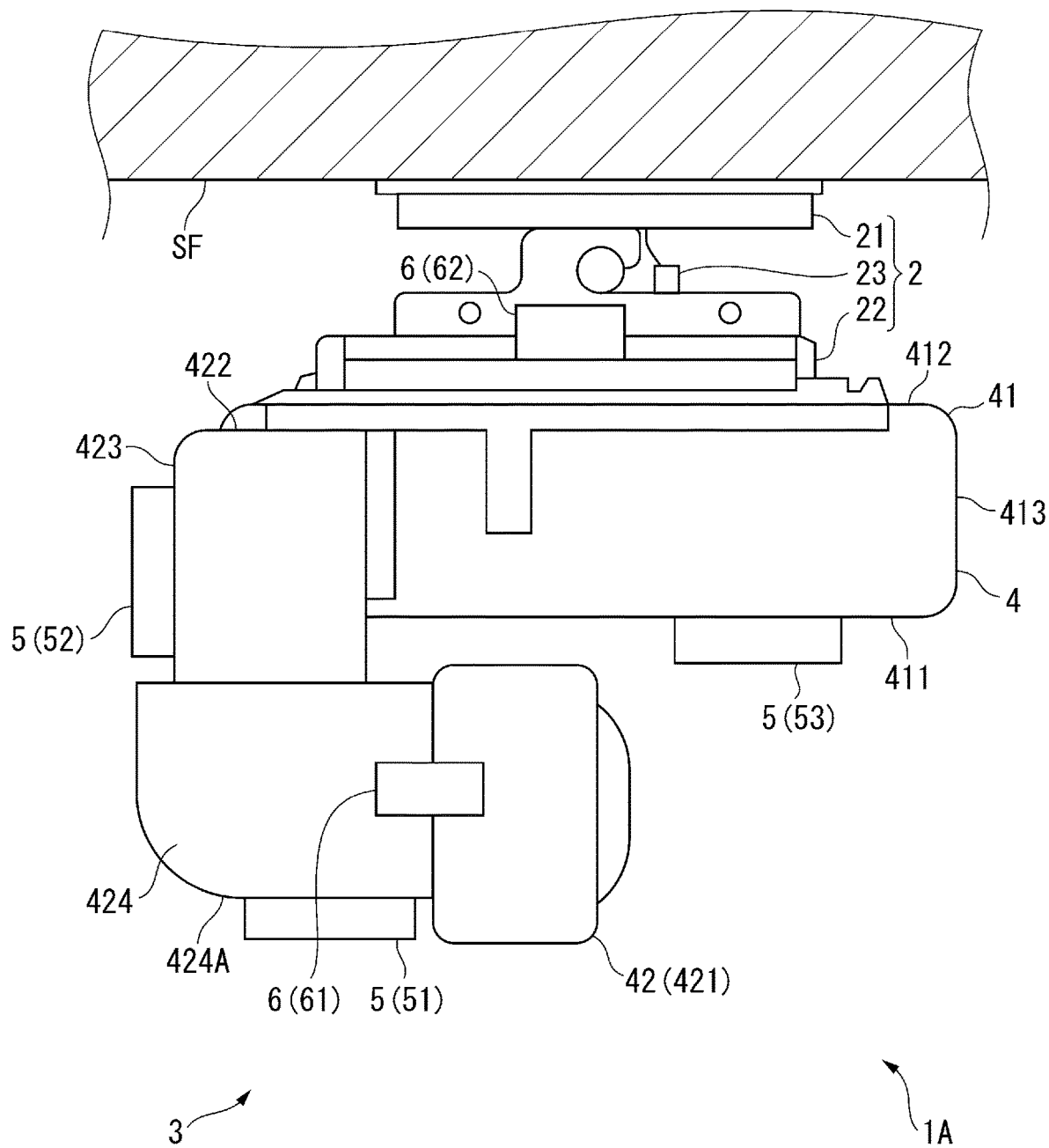
FIG. 1 is a side view showing a projection system according to a first embodiment.

FIG. 1 is a side view showing a projection system 1A according to this embodiment.

The projection system 1A according to this embodiment is attached to an installation surface SF such as a ceiling or a wall, as shown in FIG. 1, and projects image light corresponding to image information. The projection system 1A has a supporting device 2 attached to the installation surface SF, and a projector device 3 supported in a suspended state by the supporting device 2.

The suspended state refers to a state where an object is spaced away upward from an orthogonal surface in relation to the vertical direction.

Configuration of Supporting Device

The supporting device 2 in this embodiment is fixed to the installation surface SF, which is a ceiling surface, and supports a projector 4 of the projector device 3 in the suspended state. The supporting device 2 has a fixing member 21, an attachment member 22, and a coupling member 23, and is formed of a combination of these members.

The fixing member 21 is fixed to the installation surface SF with a fixture such as a bolt. The installation surface SF to which the fixing member 21 is fixed may be a sidewall surface intersecting the ceiling surface.

To the attachment member 22, the projector 4 is attached from below.

The coupling member 23 couples the fixing member 21 and the attachment member 22 together. When the fixing member 21 is fixed to the sidewall surface, the shape of the coupling member 23 may be a L-shape having a part extending along the horizontal direction and a part extending along the vertical direction.

Configuration of Projector Device

The projector device 3 has the projector 4, a vibration generation device 5, and a vibration detection device 6, and also has a reporting device 7 and a control device 8, described later.

Configuration of Projector

The projector 4 projects image light corresponding to image information onto a projection target surface such as a screen. The projector 4 has an exterior casing 41 and an image projection unit 42. In this embodiment, the projector 4 has the reporting device 7 and the control device 8, described later.

The exterior casing 41 forms the exterior of the projector 4 and accommodates the image projection unit 42. The exterior casing 41 has a top face 411, a bottom face 412, and a side face 413.

The top face 411 faces upward when the projector 4 is placed on a table or the like. The top face 411 faces downward when the projector device 3 is disposed in the suspended state.

The bottom face 412 faces downward when the projector 4 is placed on a placement surface such as a table. The bottom face 412 faces upward when the projector device 3 is disposed in the suspended state. Although not illustrated, the bottom face 412 has a leg part that comes into contact with the placement surface, and also has a fixing part to which a coupler coupling the attachment member 22 and the projector 4 together is fixed.

The side face 413 couples the top face 411 and the bottom face 412 together.

The image projection unit 42 has a light source device and an image forming device, not illustrated, and also has a projection optical device 421. The image projection unit 42 forms image light corresponding to image information by the image forming device, from light emitted from the light source device, and projects the formed image light onto the projection target surface by the projection optical device 421.

The projection optical device 421 has an incidence unit 422, a passage unit 423, and an exit unit 424, and is substantially L-shaped or substantially U-shaped.

On the incidence unit 422, the image light becomes incident from the image forming device.

The passage unit 423 extends from the incidence unit 422 in a direction from the bottom face 412 to the top face 411. The image light incident on the incidence unit 422 passes through the passage unit 423.

The exit unit 424 bends from an end part on the side opposite to the incidence unit 422, of the passage unit 423. The exit unit 424 emits the image light passing through the passage unit 423 to the projection target surface. The exit unit 424 is disposed at the most distant position from the bottom face 412 in the projector 4. Therefore, in the state where the projector 4 is supported by the supporting device 2 at the bottom face 412, the exit unit 424 is a free end of the projector 4 and a face 424A on the side opposite to the bottom face 412, of the exit unit 424, is a face at the free end.

However, the configuration of the projection optical device 421 is not limited to such a configuration and may have a linearly extending lens barrel. In such a case, the top face 411 is a face at the free end of the projector 4 in the suspended state.

Configuration of Vibration Generation Device

The vibration generation device 5 applies a vibration to a configuration where the vibration generation device 5 is provided, under the control of the control device 8, described later. That is, when the vibration generation device 5 is provided in the supporting device 2, the vibration generation device 5 generates a vibration acting on the supporting device 2. When the vibration generation device 5 is provided in the projector 4, the vibration generation device 5 generates a vibration acting on the projector 4. To describe this more in detail, the vibration generation device 5 generates a vibration corresponding to the natural frequency of the projector 4, under the control of the control device 8, described later.

In this embodiment, a plurality of vibration generation devices 5 are attached to the projector 4. The plurality of vibration generation devices 5 include vibration generation devices 51 to 53.

The vibration generation device 51 is disposed at the face 424A of the exit unit 424. That is, the vibration generation device 51 is disposed at the face at the free end of the projector 4.

The vibration generation device 52 is disposed at the passage unit 423. The vibration generation device 53 is disposed at the top face 411.

In this way, at least one vibration generation device 5, of the vibration generation devices 5 provided in the projector 4, is disposed at the free end of the projector 4 supported in the suspended state by the supporting device 2.

Configuration of Vibration Detection Device

The vibration detection device 6 is disposed, spaced apart from the vibration generation device 5. The vibration detection device 6 detects a vibration generated by the vibration generation device 5 and outputs a detection signal indicating the result of the detection to the control device 8. To describe this more in detail, the vibration detection device 6 detects a vibration of a configuration where the vibration detection device 6 is provided, of the supporting device 2 and the projector 4 made to vibrate by the vibration generation device 5.

The vibration detection device 6 has at least one sensor of an acceleration sensor and a gyro sensor. When the vibration detection device 6 has an acceleration sensor, the acceleration sensor may preferably be a 3-axis acceleration sensor. Moreover, the vibration detection device 6 may preferably have a 6-axis sensor including an acceleration sensor and a gyro sensor.

In this embodiment, a plurality of vibration detection devices 6 are provided, spaced apart from each other, in the supporting device 2 and the projector 4. Specifically, the plurality of vibration detection devices 6 include a vibration detection device 61 disposed at the exit unit 424, and a vibration detection device 62 disposed at the attachment member 22 of the supporting device 2.

In this way, the vibration detection device 61 is disposed nearer to the free end side of the projector 4 than the vibration generation device 52 disposed at the passage unit 423 and the vibration generation device 53 disposed at the top face 411. The vibration detection device 62 is disposed nearer to the fixed end of the projector 4 than the vibration generation devices 51 to 53. The fixed end of the projector 4 supported by the supporting device 2 is the bottom face 412.

Configuration of Other Parts of Projector Device

Figure 2:
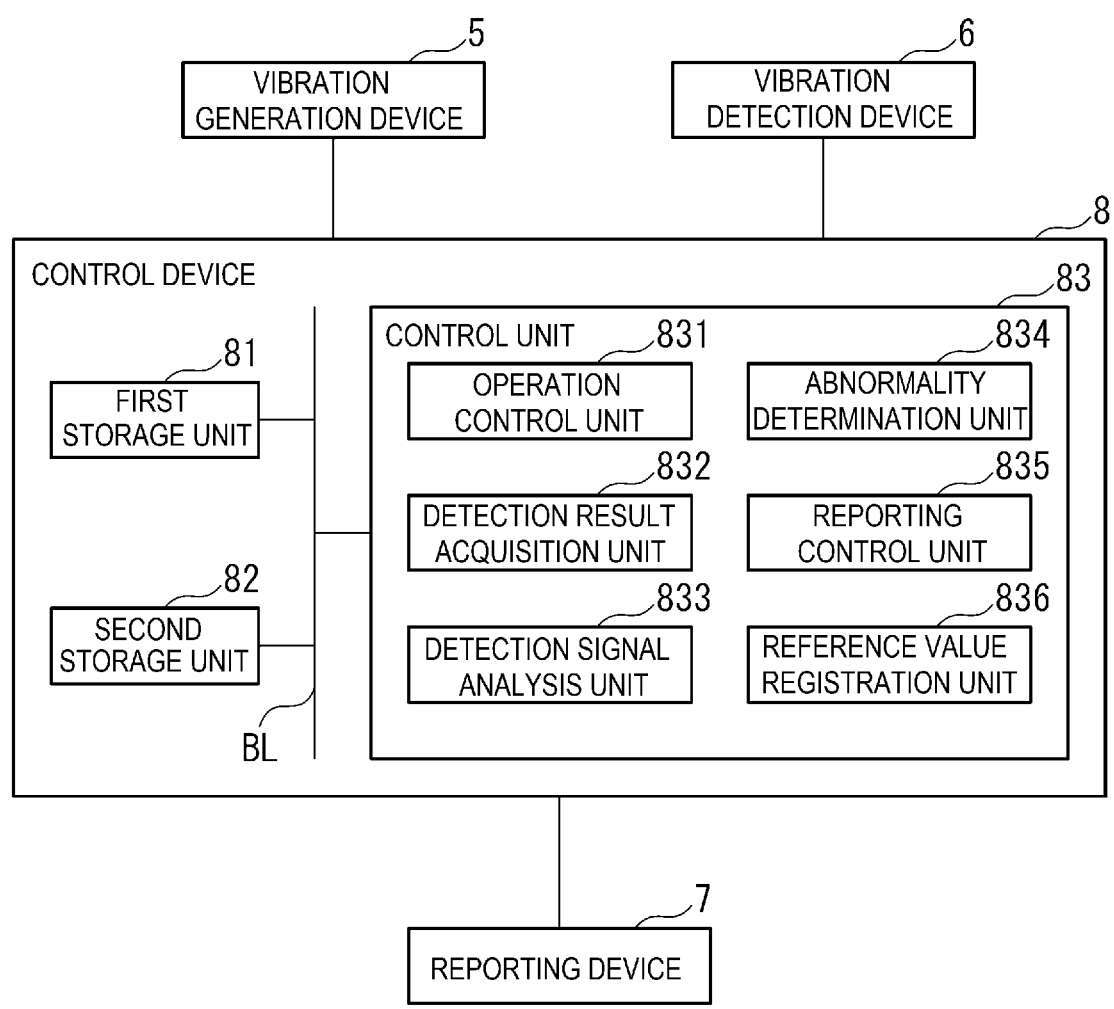
FIG. 2 is a block diagram showing a reporting device and a control device according to the first embodiment.

FIG. 2 is a block diagram showing the configuration of other parts of the projector device 3.

The projector device 3 has the reporting device 7 and the control device 8, as shown in FIG. 2. In this embodiment, the reporting device 7 and the control device 8 are provided in the projector 4 and form a part of the projector 4.

Configuration of Reporting Device

The reporting device 7 reports predetermined information to a user, under the control of the control device 8. For example, the reporting device 7 reports installation state warning information representing that the projector 4 is not properly supported by the supporting device 2 or that the installation state of the projector 4 is changed, when the control device 8 has determined that a reporting condition, described later, is satisfied.

The reporting device 7 can be formed of a display unit exposed outside the projector 4 and can also be formed of an image forming unit that causes the image projection unit 42 to display a predetermined image.

In the former case, for example, the reporting device 7 turns on or flashes on and off a light-emitting element such as an LED in a predetermined color and thus reports the installation state warning information.

In the latter case, the reporting device 7 forms an image including a predetermined message, causes the image forming device to generate a display image made up of an image based on image information with the formed image superimposed thereon, causes the projection optical device 421 to project the generated image, and thus reports the installation state warning information.

The reporting device 7 may also output a predetermined sound and thus may report the installation state warning information. In this case, the reporting device 7 may output a warning sound such as a beep or may output a voice message.

Configuration of Control Device

The control device 8 controls the vibration generation device 5 and the vibration detection device 6. The control device 8 also analyzes a vibration acting on the projector 4, based the result of detection by the vibration detection device 6, and causes the reporting device 7 to report the installation state warning information when the reporting condition is satisfied.

The control device 8 has a first storage unit 81, a second storage unit 82, and a control unit 83, which are electrically coupled via a bus line BL, as shown in FIG. 2.

The first storage unit 81 stores a necessary program and data for the control device 8 to operate. The program stored in the first storage unit 81 may be, for example, an abnormality determination program executed by the control unit 83. The data stored in the first storage unit 81 may be, for example, a reference value referred to in abnormality determination processing, described later. The reference value may be the natural frequency and the amplitude of the vibration of the projector 4. Specifically, the reference value may be the natural frequency and the amplitude stored when the projector 4 is shipped, and the natural frequency and the amplitude newly stored in the first storage unit 81 when the projector device 3 is installed.

In the description below, the natural frequency of the projector 4 stored in the first storage unit 81 when the projector 4 is shipped is referred to as an initial frequency. The amplitude of the vibration of the projector 4 stored in the first storage unit 81 when the projector 4 is shipped is referred to as an initial amplitude. The initial frequency is the natural frequency of the projector 4 as of when it is assumed that the projector 4 is properly supported by the supporting device 2. The initial amplitude is the amplitude of the vibration of the projector 4 as of when the projector 4 is made to vibrate with the natural frequency in the case where it is assumed that the projector 4 is properly supported by the supporting device 2.

The natural frequency of the projector 4 stored in the first storage unit 81 when the projector device 3 is installed is referred to as a reference frequency. The amplitude of the vibration of the projector 4 stored in the first storage unit 81 when the projector device 3 is installed is referred to as a reference amplitude.

The second storage unit 82 is a work memory of the control unit 83.

The control unit 83 is formed of at least one processor such as a CPU (central processing unit). The control unit 83 has a functional unit that functions by the control unit 83 executing the program stored in the first storage unit 81. For example, the control unit 83 has an operation control unit 831, a detection result acquisition unit 832, a detection signal analysis unit 833, an abnormality determination unit 834, a reporting control unit 835, and a reference value registration unit 836. These functional units function by the control unit 83 executing the abnormality determination program.

In this embodiment, the control unit 83 reads out the abnormality determination program and executes the abnormality determination processing when the power of the projector 4 is turned on. The control unit 83 also reads out the abnormality determination program and executes the abnormality determination processing when the projector 4 is in a sleep state. The control unit 83 may execute the abnormality determination processing every time the number of times the power of the projector 4 is turned on reaches a predetermined number of times.

The control device 8 according to this embodiment also serves as the control unit of the projector 4. Therefore, the control unit 83 also controls the operations of the projector 4.

The operation control unit 831 controls the vibration generation device 5 and causes the vibration generation device 5 to generate a vibration. To describe this more in detail, the operation control unit 831 acquires the initial frequency from the first storage unit 81 and causes the vibration generation device 5 to generate a vibration corresponding to the initial frequency. That is, the operation control unit 831 causes a vibration corresponding to the natural frequency of the projector 4 to be generated. Thus, the vibration acts on the configuration where the vibration generation device 5 is provided. When the vibration generation device 5 is provided in the supporting device 2, the vibration generated by the vibration generation device 5 acts on the supporting device 2 and thereby acts on the projector 4.

The operation control unit 831 also causes the vibration detection device 6 to detect the vibration generated by the vibration generation device 5 and acting on the projector 4.

The detection result acquisition unit 832 acquires a detection signal indicating the vibration detected by the vibration detection device 6.

The detection signal analysis unit 833 analyzes the detection signal acquired by the detection result acquisition unit 832. For example, the detection signal analysis unit 833 analyzes the acquired detection signal by Fast Fourier Transform (FFT) and acquires the peak frequency of the detection signal as the current natural frequency of the projector 4. That is, based on the acquired detection signal, the detection signal analysis unit 833 acquires the natural frequency of the projector 4 as of when the vibration is detected by the vibration detection device 6, as the detection value, and also acquires the amplitude of the detected vibration as the detection value.

Hereinafter, the natural frequency of the projector 4 acquired by the analysis of the detection signal by the detection signal analysis unit 833 is referred to as an acquired frequency. The amplitude of the vibration of the projector 4 acquired by the analysis of the detection signal by the detection signal analysis unit 833 is referred to as an acquired amplitude.

The abnormality determination unit 834 determines whether to implement the reporting of the installation state warning information by the reporting device 7, based on the result of the analysis by the detection signal analysis unit 833. That is, the abnormality determination unit 834 determines whether a reporting condition of the installation state warning information is satisfied.

The reporting condition of the installation state warning information includes a first reporting condition applied when the projector device 3 is installed to the supporting device 2, and a second reporting condition applied after the projector device 3 is installed.

The first reporting condition is a reporting condition applied in the first abnormality determination processing after the projector 4 is installed to the supporting device 2 fixed to the installation surface SF. The first reporting condition is that at least one of a condition that the difference between the initial frequency stored in the first storage unit 81 and the acquired frequency exceeds a first frequency threshold and a condition that the difference between the initial amplitude stored in the first storage unit 81 and the acquired amplitude exceeds a first amplitude threshold is satisfied. The first frequency threshold and the first amplitude threshold are stored in the first storage unit 81 in advance.

The second reporting condition is a reporting condition applied in the abnormality determination processing after the projector 4 is properly installed to the supporting device 2 fixed to the installation surface SF. The second reporting condition is that at least one of a condition that the difference between the reference frequency stored in the first storage unit 81 and the acquired frequency exceeds a second frequency threshold and a condition that the difference between the reference amplitude stored in the first storage unit 81 and the acquired amplitude exceeds a second amplitude threshold is satisfied. The second frequency threshold and the second amplitude threshold are stored in the first storage unit 81 in advance.

When executing the first abnormality determination processing after the projector 4 is attached to the supporting device 2 fixed to the installation surface SF, the abnormality determination unit 834 determines whether the first reporting condition is satisfied.

Meanwhile, when executing the abnormality determination processing at a timing such as when the power is turned on or when in the sleep state after the projector 4 is properly installed to the supporting device 2 fixed to the installation surface SF, the abnormality determination unit 834 determines whether the second reporting condition is satisfied.

Based on which of the first reporting condition and the second reporting condition the abnormality determination unit 834 performs the determination processing can be decided based on whether the reference frequency and the reference amplitude are stored in the first storage unit 81. The reference frequency and the reference amplitude are data stored in the first storage unit 81 by the reference value registration unit 836. When the reference frequency and the reference amplitude are not stored, it is because the first abnormality determination processing has not been completed properly. Meanwhile, when it is determined that the first reporting condition is not satisfied in the first abnormality determination processing and the first abnormality determination processing ends without the reporting of the installation state warning information, the reference frequency and the reference amplitude are stored in the first storage unit 81.

The reporting control unit 835 causes the reporting device 7 to report the installation state warning information when it is determined by the abnormality determination unit 834 that the first reporting condition or the second reporting condition is satisfied.

The reference value registration unit 836 registers the acquired frequency as the reference frequency in the first storage unit 81 and also registers the acquired amplitude as the reference amplitude in the first storage unit 81, when it is determined by the abnormality determination unit 834 that the first reporting condition is not satisfied, in the foregoing first abnormality determination processing. That is, the natural frequency and the amplitude of the projector 4 as of when the projector 4 is properly installed to the supporting device 2 fixed to the installation surface SF are stored as the reference frequency and the reference amplitude in the first storage unit 81. As the reference frequency and the reference amplitude stored in the first storage unit 81 are referred to in the second and later abnormality determination processing, a change in the installation state when the projector device 3 is installed can be determined.

Abnormality Determination Processing

Figure 3:
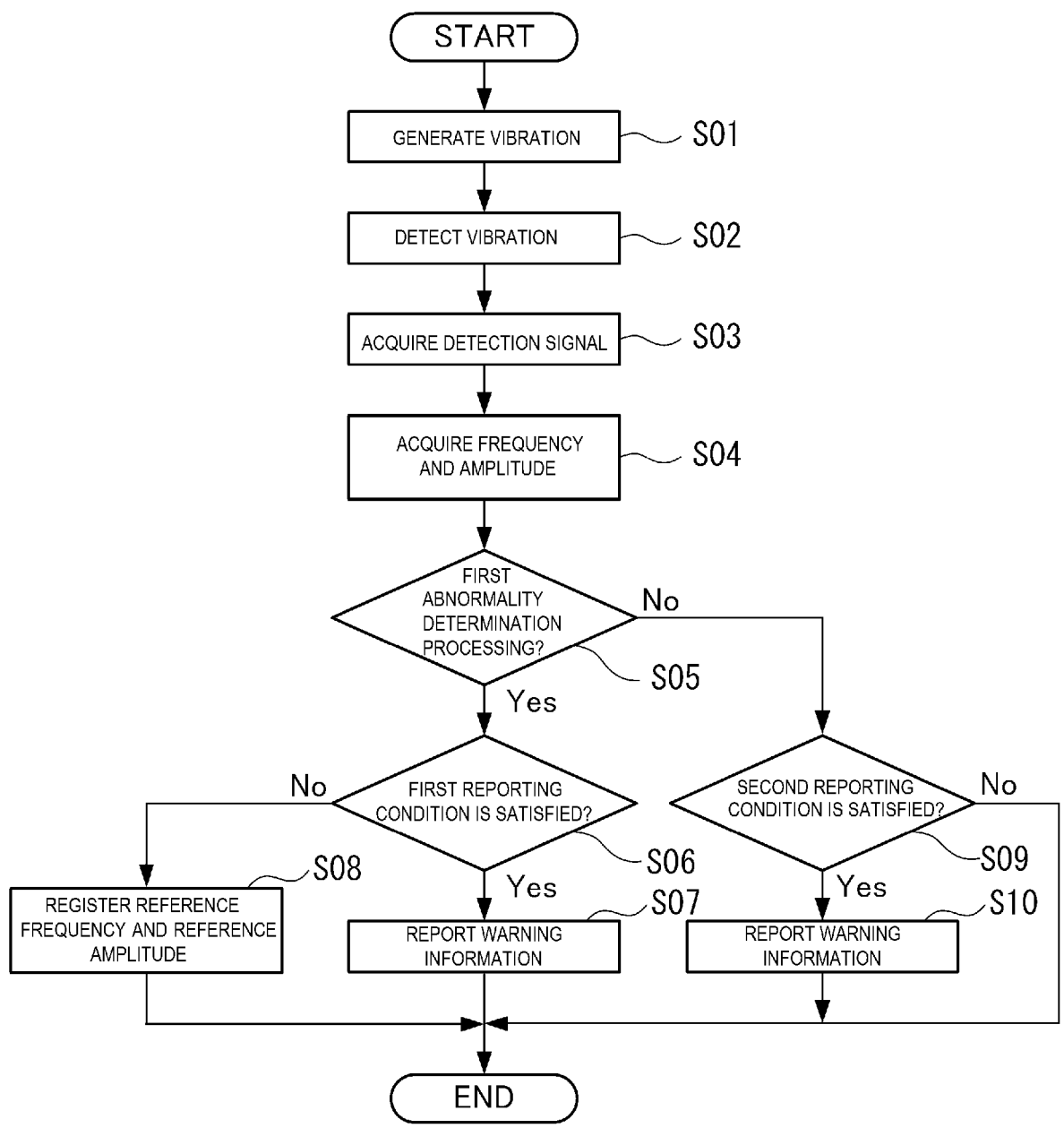
FIG. 3 is a flowchart showing abnormality determination processing according to the first embodiment.

FIG. 3 is a flowchart showing the abnormality determination processing.

The control unit 83, described above, reads out the abnormality determination program stored in the first storage unit 81 and executes the abnormality determination processing, described at a below, a timing when predetermined operation is performed by the user or at the foregoing timing such as when the power of the projector 4 is turned on.

In the abnormality determination processing, first, the operation control unit 831 causes the vibration generation device 5 to generate a vibration corresponding to the initial frequency (step S01), as shown in FIG. 3. The operation control unit 831 also causes the vibration detection device 6 to detect the vibration (step S02).

Next, the detection result acquisition unit 832 acquires a detection signal inputted from the vibration detection device 6 (step S03). The detection signal analysis unit 833 analyzes the acquired detection signal and acquires an acquired frequency and an acquired amplitude (step S04).

Subsequently, the abnormality determination unit 834 determines whether it is the first abnormality determination processing (step S05). Specifically, the abnormality determination unit 834 determines that the currently executed abnormality determination processing is the first abnormality determination processing, when the reference frequency and the reference amplitude are not stored in the first storage unit 81. The abnormality determination unit 834 determines that the currently executed abnormality determination processing is the second or later abnormality determination processing, when the reference frequency and the reference amplitude are stored.

When it is determined in the determination processing of step S05 that it is the first abnormality determination processing (Yes in step S05), the abnormality determination unit 834 acquires the initial frequency and the initial amplitude from the first storage unit 81, and determines whether the foregoing first reporting condition is satisfied, based on the initial frequency and the initial amplitude that are acquired, and the acquired frequency and the acquired amplitude (step S06).

When it is determined in the determination processing of step S06 by the abnormality determination unit 834 that the first reporting condition is satisfied (Yes in step S06), the reporting control unit 835 causes the reporting device 7 to report the installation state warning information (step S07). Subsequently, the control unit 83 ends the abnormality determination processing.

When it is determined in the determination processing of step S06 by the abnormality determination unit 834 that the first reporting condition is not satisfied (No in step S06), the reference value registration unit 836 registers the acquired frequency as the reference frequency in the first storage unit 81 and also registers the acquired amplitude as the reference amplitude in the first storage unit 81 (step S08). Subsequently, the control unit 83 ends the abnormality determination processing.

When it is determined in the determination processing S05 that it is the second or later abnormality determination processing (No in step S05), the abnormality determination unit 834 acquires the reference frequency and the reference amplitude from the first storage unit 81, and determines whether the foregoing second reporting condition is satisfied, based on the reference frequency and the reference amplitude that are acquired, and the acquired frequency and the acquired amplitude (step S09).

When it is determined in the determination processing of step S09 that the second reporting condition is satisfied (Yes in step S09), the reporting control unit 835 causes the reporting device 7 to report the installation state warning information (step S10). Subsequently, the control unit 83 ends the abnormality determination processing.

When it is determined in the determination processing of step S09 that the second reporting condition is not satisfied (No in step S09), the control unit 83 ends the abnormality determination processing.

By such abnormality determination processing, whether the installation state of the projector device 3 to the supporting device 2 is changed can be determined, and the installation state warning information can be reported to the user when the installation state is changed.

Effects of First Embodiment

The projection system 1A according to this embodiment has the following effects.

The projector device 3 has the projector 4, the vibration generation device 5, the vibration detection device 6, and the reporting device 7.

The projector 4 is supported in the suspended state by the supporting device 2.

The vibration generation device 5 generates a vibration acting on at least one of the supporting device 2 and the projector 4.

The vibration detection device 6 detects the vibration of the projector 4.

The reporting device 7 compares the detection value detected by the vibration detection device 6 with the reference value and gives a report when the reporting condition is satisfied. Specifically, the detection value detected by the vibration detection device 6 is the acquired frequency and the acquired amplitude. When it is the first abnormality determination processing, the reference value is the initial frequency and the initial amplitude. When it is the second or later abnormality determination processing, the reference value is the reference frequency and the reference amplitude.

When the coupling between the supporting device 2 and the projector 4 is weak, the natural frequency of the projector 4 shifts to the lower-frequency side and the amplitude of the vibration of the projector 4 increases.

In this regard, the vibration generation device 5 applies a vibration to the projector 4. The vibration detection device 6 detects the vibration of the projector 4. The detection value detected by the vibration detection device 6 is compared with the reference value. Thus, whether the projector 4 is properly installed, and whether the suspended state of the projector 4 is changed from the initial suspended state, can be grasped. When the reporting condition is satisfied as the result of the comparison between the detection value and the reference value, the reporting device 7 gives a report.

In the first abnormality determination processing, the reference value is the initial frequency and the initial amplitude and is the natural frequency and the amplitude of the projector 4 as of when it is assumed that the projector 4 is properly supported by the supporting device 2. Therefore, based on the comparison between such a reference value, and the acquired frequency and the acquired amplitude, whether the projector 4 is properly supported to the supporting device 2 can be determined.

In the and second later abnormality determination processing, the reference value is the acquired frequency and the acquired amplitude as of when it is determined in the first abnormality determination processing that the first reporting condition is not satisfied, and is the natural frequency and the amplitude as of when the projector 4 is properly installed. Therefore, based on the comparison between such a reference value, and the acquired frequency and the acquired amplitude that are newly acquired, a change in the installation state of the projector 4 can be grasped early.

Thus, the projector 4 can be properly installed and a change in the installation state of the projector 4 can be detected early.

The projector device 3 has the control device 8. The control device 8 has the operation control unit 831 controlling the operation of the vibration generation device 5. The operation control unit 831 causes the vibration generation device 5 to generate a vibration with the natural frequency of the projector 4.

According to such a configuration, the vibration generation device 5 causes the vibration with the natural frequency of the projector 4 to act on the projector 4. Thus, the projector 4 resonates and vibrates more strongly. Therefore, the vibration detection device 6 can more easily detect the vibration of the projector 4. Accordingly, the installation state of the projector 4 can be detected accurately.

In the projector device 3, the control device 8 executes the foregoing abnormality determination processing at least at one of the time when the projector 4 is in the sleep state and the time when the power of the projector 4 is turned on. That is, the control device 8 causes the vibration generation device 5 to generate a vibration at least at one of the time when the projector 4 is in the sleep state and the time when the power of the projector 4 is turned on.

According to such a configuration, the installation state of the projector 4 can be detected before the projector 4 projects image light.

In the projector device 3, the vibration generation device 51 is disposed at the face 424A at the free end of the projector 4.

When the projector 4 vibrates, the displacement of the free end of the projector 4 is greater than the displacement of the other parts. Therefore, since the vibration generation device 51 is disposed at the face 424A at the free end, the amplitude of the vibration acting on the projector 4 can be increased. Thus, the vibration detection device 6 can more easily detect the vibration of the projector 4. The installation state of the projector 4 can be detected accurately.

In the projector device 3, the vibration detection device 62 is disposed in the supporting device 2.

According to such a configuration, the vibration detection device 62 can more easily detect the vibration of the supporting device 2. Thus, an attachment defect of the supporting device 2 to the installation surface SF can be detected accurately.

The abnormality determination processing includes the abnormality determination method according to the present disclosure. The abnormality determination processing is executed by the control device 8 controlling: the vibration generation device 5 generating a vibration acting on at least one of the supporting device 2 and the projector 4 installed in the suspended state by the supporting device 2; the vibration detection device 6 detecting the vibration of the projector 4 generated by the vibration generation device 5; and the reporting device 7.

The abnormality determination processing includes: step S01 of causing the vibration generation device 5 to generate a vibration; step S02 of causing the vibration detection device 6 to detect the generated vibration; and steps S07, S10 of comparing a detection value of the vibration detected by the vibration detection device 6 with the reference value and causing the reporting device 7 to give a report when the reporting condition is satisfied.

Step S01 is equivalent to a vibration generation procedure. Step S02 is equivalent to a detection procedure. Steps S07, S10 are equivalent to reporting procedures.

As the control device 8 executes such an abnormality determination method, effects similar to those of the foregoing projector device 3 can be achieved.

Modifications of First Embodiment

The foregoing projection system 1A has a plurality of vibration generation devices 5 and a plurality of vibration detection devices 6. The vibration generation devices 5 and the vibration detection devices 6 are disposed as described above. However, this is not limiting. The number of vibration generation devices 5 and the arrangement thereof can be suitably changed. The number of vibration detection devices 6 and the arrangement thereof can be suitably changed as well.

First Modification Example of First Embodiment

Figure 4:
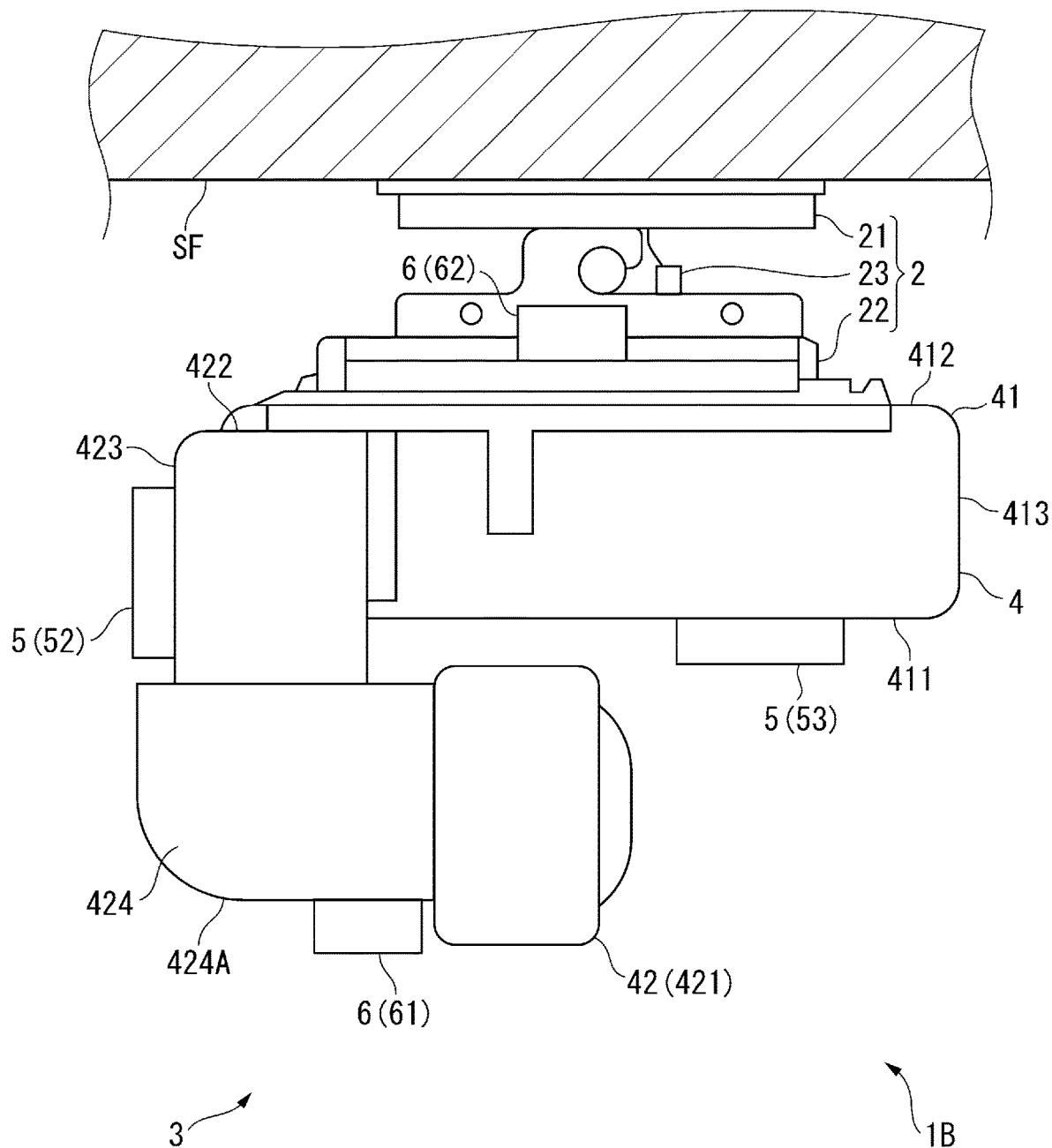
FIG. 4 is a side view showing a first modification example of the projection system according to the first embodiment.

FIG. 4 is a side view showing a projection system 1B, which is a first modification example of the projection system 1A.

The projection system 1B has configurations and functions similar to those of the projection system 1A according to the first embodiment, except for not having the vibration generation device 51 of the vibration generation devices 51 to 53. That is, in the projection system 1B, the vibration detection device 61 is disposed nearer to the free end of the projector 4 in relation to the supporting device 2 than the other vibration generation devices 52, 53. To describe this more in detail, the vibration detection device 61 is provided at the face 424A of the projection optical device 421, which is at the free end of the projector 4.

In such a projection system 1B, the vibration detection device 61 is provided at a part where the amplitude of the vibration increases, in the projector 4. Therefore, the vibration detection device 61 can detect the vibration of the projector 4 more accurately.

Second Modification Example of First Embodiment

Figure 5:
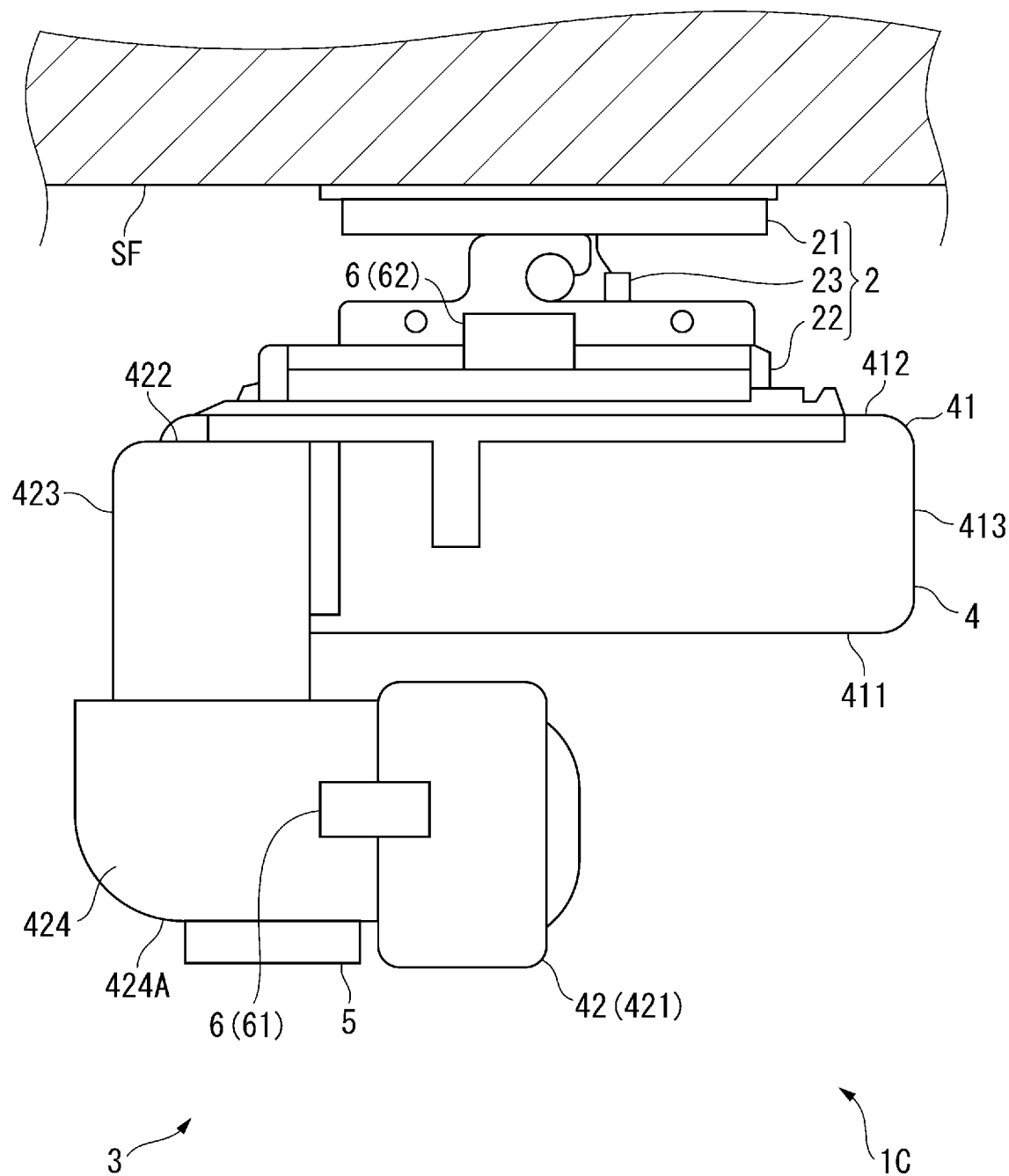
FIG. 5 is a side view showing a second modification example of the projection system according to the first embodiment.

FIG. 5 is a side view showing a projection system 1C, which is a second modification example of the projection system 1A.

The projection system 1C has configurations and functions similar to those of the projection system 1A according to the first embodiment, except that one vibration generation device 5 is disposed in the projector 4, of the supporting device 2 and the projector 4, and that the vibration detection device 6 is disposed at a plurality of positions spaced apart from each other in the supporting device 2 and the projector 4, as shown in FIG. 5.

That is, in the projection system 1C, the one vibration generation device 5 is disposed at the face 424A of the projection optical device 421, which is at the free end of the projector 4, similarly to the foregoing vibration generation device 51. As in the projection system 1A, the vibration detection device 61 of the plurality of vibration detection devices 6 is spaced apart from the vibration generation device 5 and disposed at the exit unit 424. The vibration detection device 62 is spaced apart from the vibration generation device 5 and disposed at the attachment member 22 of the supporting device 2.

The control device 8 determines whether the reporting condition is satisfied, based on the result of the comparison between the detection values detected by the plurality of vibration detection devices 61, 62 and the reference value. When the reporting condition is satisfied, the reporting device 7 gives a report.

In such a projection system 1C, the vibration detection devices 61, 62 detect the vibration from the plurality of positions in the supporting device 2 and the projector 4. Therefore, the vibration of the entirety of the projection system 1C including the supporting device 2 and the projector 4 can be detected more accurately. Thus, the installation state of the projector 4 can be grasped more accurately.

The vibration generation device 5 may be disposed at other parts than the face 424A in the projector 4 or may be disposed in the supporting device 2. The vibration detection device 6 may not be disposed in each of the supporting device 2 and the projector 4. That is, the plurality of vibration detection devices 6 may be disposed, spaced apart from the vibration generation device 5. For example, the plurality of vibration detection devices 6 may be disposed only in the supporting device 2. Also, the plurality of vibration detection devices 6 may be disposed only in the projector 4.

Second Embodiment

A second embodiment of the present disclosure will now be described.

The projection system according to this embodiment has a configuration similar to that of the projection system 1A according to the first embodiment but differs in that the vibration generation device 5 and the vibration detection device 6 are each provided in the projector. In the description below, a part that is the same or substantially the same as an already described part is denoted by the same reference sign and is not described further in detail.

Figure 6:
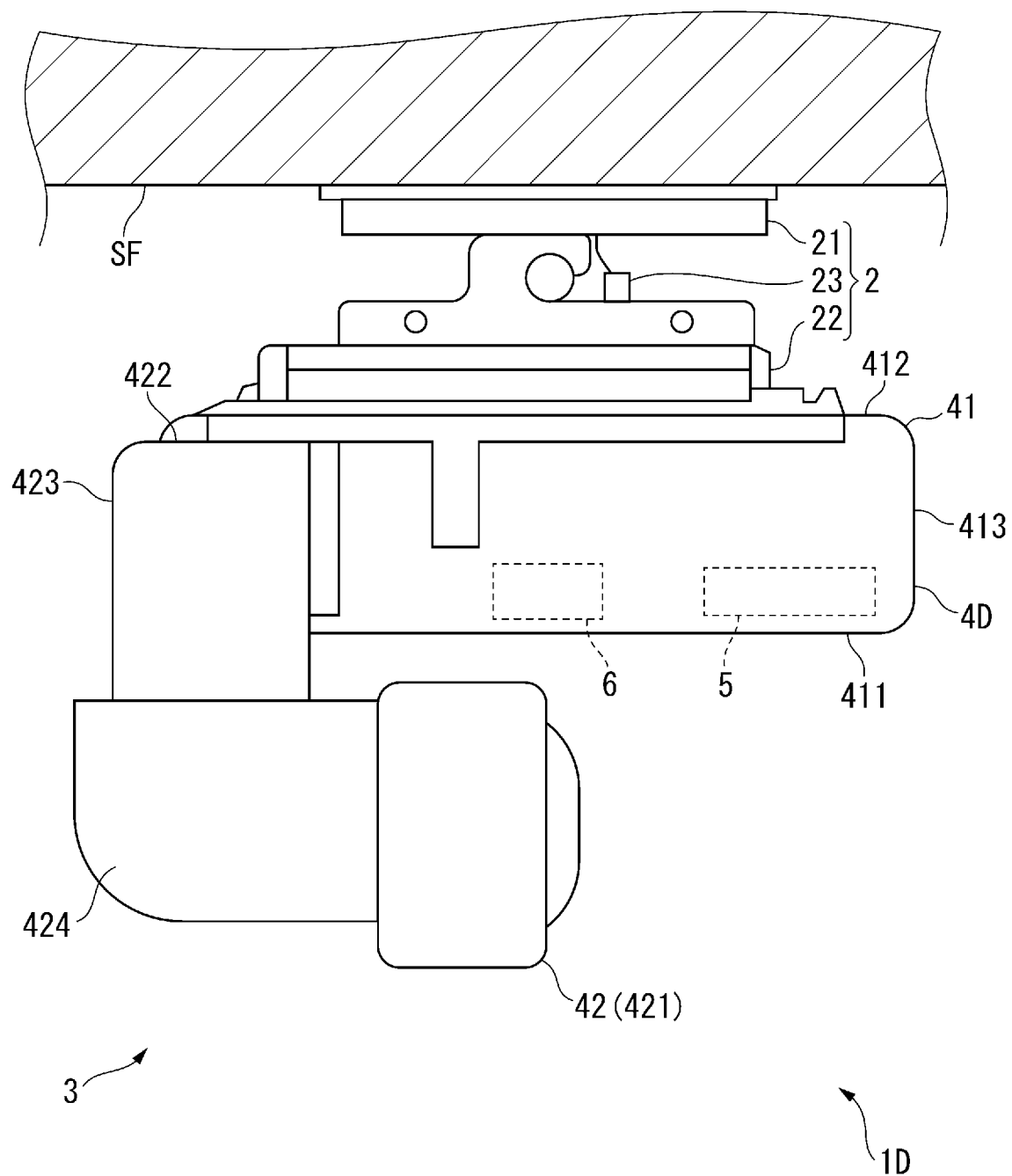
FIG. 6 is a side view showing the configuration of a projection system according to a second embodiment.

FIG. 6 is a side view showing the configuration of a projection system 1D according to this embodiment.

The projection system 1D according to this embodiment has a configuration similar to that of the projection system 1A according to the first embodiment, except for having a projector 4D shown in FIG. 6 instead of the projector 4 and except that the vibration generation device 5 and the vibration detection device 6 form the projector 4D.

That is, the projection system 1D according to this embodiment has the supporting device 2 fixed to the installation surface SF, and the projector 4D attached to the attachment member 22 of the supporting device 2. The projector 4D has the vibration generation device 5 and the vibration detection device 6 and also has configurations and functions similar to those of the projector 4 according to the first embodiment.

In FIG. 6, the vibration generation device 5 and the vibration detection device 6 are accommodated in the exterior casing 41 of the projector 4D. However, this is not limiting. The vibration generation device 5 and the vibration detection device 6 may be provided outside the exterior casing 41, as in the projector 4.

Effects of Second Embodiment

The projection system 1D according to this embodiment, described above, can achieve effects similar to those of the projection system 1A according to the first embodiment.

That is, the projector 4D is a projector supported in the suspended state by the supporting device 2 fixed to the installation surface SF. The projector 4D has the vibration generation device 5 generating a vibration, the vibration detection device 6 detecting the vibration, and the reporting device 7 comparing the detection value detected by the vibration detection device 6 with the reference value, and giving a report when the reporting condition is satisfied.

Such a projector 4D can achieve effects similar to those of the projector device 3 according to the first embodiment.

Third Embodiment

A third embodiment of the present disclosure will now be described.

The projection system according to this embodiment has a configuration similar to that of the projection system 1A according to the first embodiment but differs in that the vibration generation device 5 and the vibration detection device 6 are provided in the supporting device. In the description below, a part that is the same or substantially the same as an already described part is denoted by the same reference sign and is not described further in detail.

Figure 7:
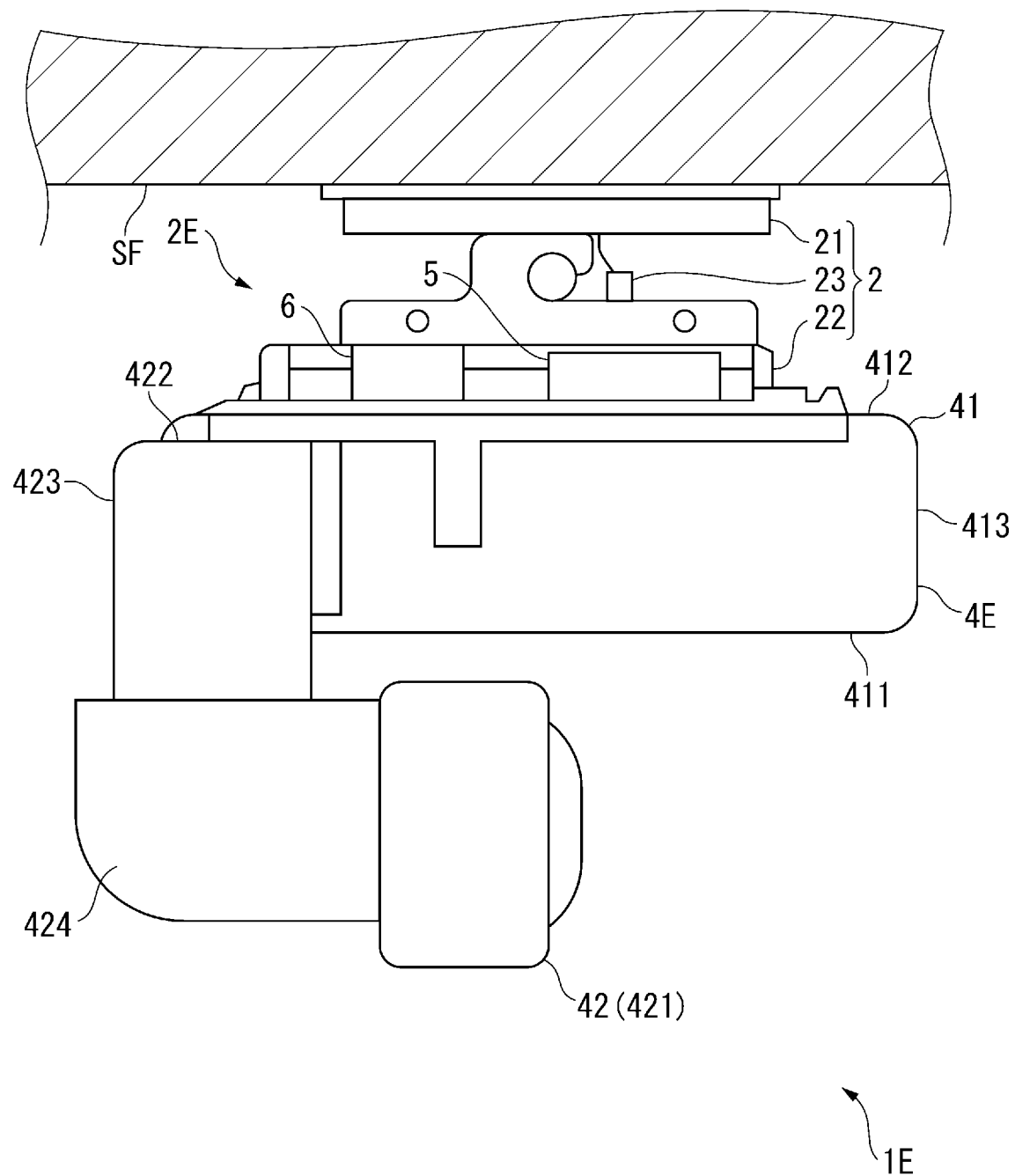
FIG. 7 is a side view showing the configuration of a projection system according to a third embodiment.

FIG. 7 is a side view showing a projection system 1E according to this embodiment.

The projection system 1E according to this embodiment has a supporting device 2E fixed to the installation surface SF, and a projector 4E attached to the supporting device 2E, as shown in FIG. 7.

The supporting device 2E has the fixing member 21, the attachment member 22, and the coupling member 23, and also has the vibration generation device 5 and the vibration detection device 6, similarly to the supporting device 2. Although not illustrated in the drawing, the supporting device 2E also has the reporting device 7, the control device 8, and a power supply unit, not illustrated, that supplies electric power to the devices 5 to 8.

The projector 4E does not have the vibration generation device 5 and the vibration detection device 6. The control unit of the projector 4E has a configuration similar to that of the projector 4, except for not executing the abnormality determination processing.

In such a projection system 1E, the control device 8 executes abnormality determination processing similar to the abnormality determination processing according to the first embodiment.

In this embodiment, in step S01, the vibration generation device 5 generates a vibration acting on the supporting device 2E. In step S02, the vibration detection device 6 detects the vibration generated by the vibration generation device 5. That is, the vibration detection device 6 detects the vibration of the supporting device 2E and thereby detects the vibration of the projector 4E.

The processing from step S03 onward is similar to the abnormality determination processing according to the first embodiment.

In the projection system 1E, the supporting device 2E has one vibration generation device 5 and one vibration detection device 6. However, the supporting device 2E may have a plurality of vibration generation devices 5 and may have a plurality of vibration detection devices 6.

The control device 8 forming the supporting device 2E may be electrically coupled to the projector 4E. In this case, the reporting control unit 835 may cause the image projection unit 42 of the projector 4E to display the installation state warning information in a projection image.

Effects of Third Embodiment

The projection system 1E according to this embodiment, described above, can achieve effects similar to those of the projection system 1A according to the first embodiment.

That is, the supporting device 2E supports the projector 4E in the suspended state.

The supporting device 2E has the vibration generation device 5 generating a vibration, the vibration detection device 6 detecting the vibration, and the reporting device 7 comparing the detection value detected by the vibration detection device 6 with the reference value, and giving a report when the reporting condition is satisfied.

According to such a configuration, the attachment state of the supporting device 2E to the installation surface SF and the installation state of the projector 4E to the supporting device 2E can be grasped, as in the foregoing projector device 3 and the projector 4D.

Fourth Embodiment

A fourth embodiment of the present disclosure will now be described.

The projection system according to this embodiment has a configuration similar to that of the projection system 1A according to the first embodiment but differs in that the vibration generation device 5, the vibration detection device 6, the reporting device 7, and the control device 8 form an abnormality determination device that is different from the supporting device 2 and the projector 4. In the description below, a part that is the same or substantially the same as an already described part is denoted by the same reference sign and is not described further in detail.

Figure 8:
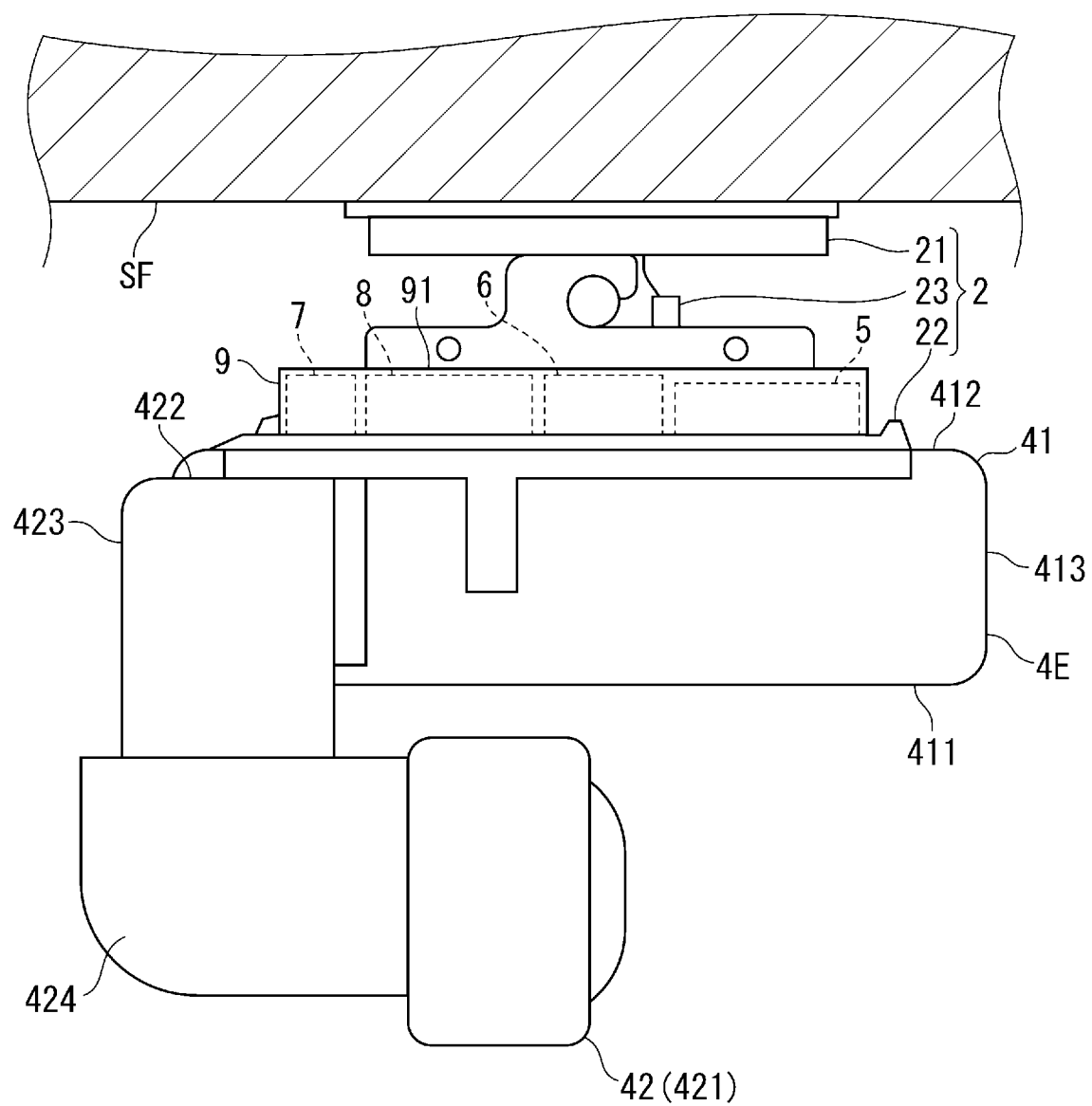
FIG. 8 is a side view showing the configuration of a projection system according to a fourth embodiment.

FIG. 8 is a side view showing the configuration of a projection system 1F according to this embodiment.

The projection system 1F according to this embodiment has the supporting device 2 according to the first embodiment, the projector 4E according to the third embodiment, and an abnormality determination device 9.

As described above, the supporting device 2 is fixed to the installation surface SF, and the projector 4E is supported in the suspended state by the supporting device 2 at the bottom face 412.

The abnormality determination device 9 has at least one vibration generation device 5, at least one vibration detection device 6, the reporting device 7, the control device 8, and a casing 91, and also has a power supply unit, not illustrated.

The casing 91 accommodates the vibration generation device 5, the vibration detection device 6, the reporting device 7, the control device 8, and the power supply unit.

The control device 8 executes abnormality determination processing similar to the abnormality determination processing according to the first embodiment, similarly to the control device 8 in the third embodiment.

The abnormality determination device 9 according to this embodiment is attached to the supporting device 2. However, this is not limiting. The abnormality determination device 9 may be attached to the projector 4E. In this case, the vibration generation device 5 generates a vibration acting directly on the projector 4E.

The control device 8 forming the supporting device 2 may be electrically coupled to the projector 4E. In this case, the reporting control unit 835 may cause the image projection unit 42 of the projector 4E to display the installation state warning information in a projection image.

Effects of Fourth Embodiment

The projection system 1F according to this embodiment, described above, can achieve effects similar to those of the projection system 1A according to the first embodiment.

That is, the abnormality determination device 9 has the vibration generation device 5, the vibration detection device 6, and the reporting device 7. The vibration generation device 5 generates a vibration acting on at least one of the supporting device 2 and the projector 4E installed in the suspended state by the supporting device 2. The vibration detection device 6 detects the vibration generated by the vibration generation device 5. The reporting device 7 compares the detection value detected by the vibration detection device 6 with the reference value, and gives a report when the reporting condition is satisfied.

With such an abnormality determination device 9, the installation state of the projector 4E to the supporting device 2 can be grasped and a change in the installation state of the projector 4E can be detected early, similarly to the projector device 3 according to the first embodiment, the projector 4D according to the second embodiment, and the supporting device 2E according to the third embodiment.

Modifications of Embodiments

The present disclosure is not limited to the foregoing embodiments and includes modifications and improvements or the like within a range that can achieve the objective of the present disclosure.

In the first embodiment, the control device 8 also functions as the control unit of the projector 4. However, this is not limiting. The control device 8 may be provided outside the projector 4, independently of the control unit of the projector 4 and as a unit that controls the vibration generation device 5, the vibration detection device 6, and the reporting device 7. In this case, the control device 8 may be electrically coupled to the projector 4 and may output a control signal to the projector 4 and thus may cause the projector 4 to display an image including the installation state warning information.

In the foregoing embodiments, the vibration generation device 5 generates a vibration with the natural frequency of the projectors 4, 4D, 4E. To describe this more in detail, the vibration generation device 5 generates a vibration with the initial frequency of the projectors 4, 4D, 4E. However, this is not limiting. The frequency of the vibration generated by the vibration generation device 5 may be a different frequency from the initial frequency of the projectors 4, 4D, 4E.

In the foregoing embodiments, the abnormality determination processing is executed and the vibration generation device 5 generates a vibration, at least at one of a time when the projectors 4, 4D, 4E are in the sleep states and a time when the power of the projectors 4, 4D, 4E are turned on. However, this is not limiting. The abnormality determination processing may be executed at any timing designated by the user or may be executed every time the time elapsed from the installation of the projectors 4, 4D, E to the supporting devices 2, 2E reaches a predetermined time.

Overall Summary of Present Disclosure

An overall summary of the present disclosure is given below in the form of supplementary notes.

Supplementary Note 1

A projector device includes: a projector supported in a suspended state by a supporting device; a vibration generation device that generates a vibration acting on at least one of the supporting device and the projector; a vibration detection device that detects a vibration of the projector; and a reporting device that compares a detection value detected by the vibration detection device with a reference value and gives a report when a reporting condition is satisfied.

For example, when the coupling between the supporting device and the projector is weak, the natural frequency of the projector shifts to the lower-frequency side and the amplitude of the vibration of the projector increases.

In this regard, according to the foregoing configuration, the vibration generation device applies a vibration to the supporting device or the projector. The vibration detection device detects the vibration of the projector. The detection value detected by the vibration detection device is compared with the reference value. Thus, whether the suspended state of the projector is changed from the initial suspended state can be grasped. When the reporting condition is satisfied as the result of the comparison between the detection value and the reference value, the reporting device gives a report. Therefore, when the reference value is the value as of when the projector is properly supported by the supporting device, the user can grasp whether the projector is properly supported to the supporting device when the projector is installed. When the reference value is the detection value detected when the projector is installed, a change in the suspended state of the projector after the installation can be grasped early. Thus, the projector can be properly installed and a change in the installation state of the projector can be detected early.

Supplementary Note 2

The projector device according to Supplementary Note 1 includes a control device that controls an operation of the vibration generation device. The control device causes the vibration generation device to generate a vibration with a natural frequency of the projector.

According to such a configuration, the vibration generation device causes the vibration with the natural frequency of the projector to act on the projector. Thus, the projector resonates and vibrates strongly. Therefore, the vibration detection device can more easily detect the vibration of the projector. Accordingly, the installation state of the projector can be detected accurately.

Supplementary Note 3

In the projector device according to Supplementary Note 2, the control device causes the vibration generation device to generate a vibration at least at one of a time when the projector is in a sleep state and a time when a power of the projector is turned on.

According to such a configuration, the installation state of the projector can be detected before the projector projects image light.

Supplementary Note 4

In the projector device according to one of Supplementary Notes 1 to 3, the vibration generation device is disposed at a face at a free end of the projector.

When the projector vibrates, the displacement of the free end of the projector is greater than the displacement of the other parts. Therefore, since the vibration generation device is disposed at the face at the free end, the amplitude of the vibration acting on the projector can be increased. Thus, the vibration detection device can more easily detect the vibration of the projector. The installation state of the projector can be detected accurately.

Supplementary Note 5

In the projector device according to one of Supplementary Notes 1 to 3, the vibration detection device is disposed nearer to a free end in relation to the supporting device than the vibration generation device.

According to such a configuration, the vibration detection device is provided at a part where the amplitude of the vibration increases, in the projector. Therefore, the vibration detection device can detect the vibration of the projector more accurately.

Supplementary Note 6

In the projector device according to Supplementary Note 5, the vibration detection device is disposed in the supporting device.

According to such a configuration, the vibration detection device can more easily detect the vibration of the supporting device. Thus, an attachment defect of the supporting device to the installation surface can be detected accurately.

Supplementary Note 7

In the projector device according to one of Supplementary Notes 1 to 3, the vibration generation device, single in number, is disposed in one of the supporting device and the projector. The vibration detection device is disposed at a plurality of positions spaced apart from each other in the supporting device and the projector. The reporting device gives a report when the reporting condition is satisfied, based on a result of comparison between a detection value detected by a plurality of the vibration detection devices and the reference value.

According to such a configuration, the plurality of vibration detection devices detect the vibration from the plurality of positions. Therefore, the vibration of the entirety: including the supporting device and the projector can be detected more accurately. Thus, the installation state of the projector can be grasped more accurately.

Supplementary Note 8

A projector supported in a suspended state by a supporting device is provided. The projector includes: a vibration generation device that generates a vibration; a vibration detection device that detects a vibration; and a reporting device that compares a detection value detected by the vibration detection device with a reference value and gives a report when a reporting condition is satisfied.

Such a configuration can achieve effects similar to those of the foregoing projector device.

Supplementary Note 9

A supporting device supporting a projector in a suspended state is provided. The supporting device includes: a vibration generation device that generates a vibration; a vibration detection device that detects a vibration; and a reporting device that compares a detection value detected by the vibration detection device with a reference value and gives a report when a reporting condition is satisfied.

According to such a configuration, the attachment state of the supporting device to the installation surface and the installation state of the projector to the supporting device can be grasped and a change in the installation state of the projector can be detected early, as in the projector device and the projector, described above.

Supplementary Note 10

An abnormality determination device includes: a vibration generation device that generates a vibration acting on at least one of a supporting device and a projector installed in a suspended state by the supporting device; a vibration detection device that detects the vibration generated by the vibration generation device; and a reporting device that compares a detection value detected by the vibration detection device with a reference value and gives a report when a reporting condition is satisfied.

According to a such configuration, the installation state of the projector to the supporting device can be grasped and a change in the installation state of the projector can be detected early, as in the projector device, the projector, and the supporting device, described above.

Supplementary Note 11

An abnormality determination method is executed by a control device that controls a vibration generation device which generates a vibration acting on at least one of a supporting device and a projector installed in a suspended state by the supporting device, a vibration detection device which detects a vibration, and a reporting device. The abnormality determination method includes: a vibration generation procedure of causing the vibration generation device to generate a vibration; a detection procedure of causing the vibration detection device to detect the generated vibration; and a reporting procedure of comparing a detection value of the vibration detected by the vibration detection device with a reference value and causing the reporting device to give a report when a reporting condition is satisfied.

As the abnormality determination device executes such an abnormality determination method, effects similar to those of the foregoing projector device can be achieved.

What is claimed is:
1. A projector device comprising:
   a projector supported in a suspended state by a supporting device;
   a vibration generation device that generates a vibration acting on at least one of the supporting device and the projector;
   a vibration detection device that detects a vibration of the projector; and
   a reporting device that compares a detection value detected by the vibration detection device with a reference value and gives a report when a reporting condition is satisfied, wherein
   the vibration detection device is disposed nearer to a free end in relation to the supporting device than the vibration generation device, and
   the vibration detection device is disposed in the supporting device.
2. The projector device according to claim 1, further comprising:
   a control device that controls an operation of the vibration generation device, wherein
   the control device causes the vibration generation device to generate a vibration with a natural frequency of the projector.
3. The projector device according to claim 2, wherein
   the control device causes the vibration generation device to generate a vibration at least at one of a time when the projector is in a sleep state and a time when a power of the projector is turned on.
4. The projector device according to claim 1, wherein
   the vibration generation device is disposed at a face at a free end of the projector.
5. The projector device according to claim 1, wherein
   the vibration generation device, single in number, is disposed in one of the supporting device and the projector,
   the vibration detection device is disposed at a plurality of positions spaced apart from each other in the supporting device and the projector, and
   the reporting device gives a report when the reporting condition is satisfied, based on a result of comparison between a detection value detected by a plurality of the vibration detection devices and the reference value.
6. A projector supported in a suspended state by a supporting device, the projector comprising:
   a vibration generation device that generates a vibration;
   a vibration detection device that detects a vibration; and
   a reporting device that compares a detection value detected by the vibration detection device with a reference value and gives a report when a reporting condition is satisfied, wherein
   the vibration detection device is disposed nearer to a free end in relation to the supporting device than the vibration generation device, and
   the vibration detection device is disposed in the supporting device.
7. A supporting device supporting a projector in a suspended state, the supporting device comprising:
   a vibration generation device that generates a vibration;
   a vibration detection device that detects a vibration; and
   a reporting device that compares a detection value detected by the vibration detection device with a ref- erence value and gives a report when a reporting condition is satisfied, wherein the vibration detection device is disposed nearer to a free end in relation to the supporting device than the vibration generation device, and the vibration detection device is disposed in the supporting device.

8. An abnormality determination device comprising:

a vibration generation device that generates a vibration acting on at least one of a supporting device and a projector installed in a suspended state by the supporting device;

a vibration detection device that detects a vibration; and a reporting device that compares a detection value detected by the vibration detection device with a reference value and gives a report when a reporting condition is satisfied, wherein the vibration detection device is disposed nearer to a free end in relation to the supporting device than the vibration generation device, and the vibration detection device is disposed in the supporting device.

9. An abnormality determination method executed by a control device that controls a vibration generation device which generates a vibration acting on at least one of a supporting device and a projector supported in a suspended state by the supporting device, a vibration detection device which detects a vibration, and a reporting device, the abnormality determination method comprising:

a vibration generation procedure of causing the vibration generation device to generate a vibration;

a detection procedure of causing the vibration detection device to detect the generated vibration; and a reporting procedure of comparing a detection value of the vibration detected by the vibration detection device with a reference value and causing the reporting device to give a report when a reporting condition is satisfied, wherein the vibration detection device is disposed nearer to a free end in relation to the supporting device than the vibration generation device, and the vibration detection device is disposed in the supporting device.

* * * * *